(12) United States Patent
Pelaez et al.

(10) Patent No.: US 12,511,766 B2
(45) Date of Patent: Dec. 30, 2025

(54) TRANSMISSION APPARATUS, NON-TRANSITORY COMPUTER READABLE MEDIUM, AND RECEPTION APPARATUS THAT REDUCE THE PIXEL DATA SIZE OF THE DEPTH IMAGE

(71) Applicant: TOYOTA JIDOSHA KABUSHIKI KAISHA, Toyota (JP)

(72) Inventors: Jorge Pelaez, Kawaguchi (JP); Tatsuro Hori, Edogawa-ku (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 366 days.

(21) Appl. No.: 18/341,382

(22) Filed: Jun. 26, 2023

(65) Prior Publication Data

US 2023/0419518 A1   Dec. 28, 2023

(30) Foreign Application Priority Data

Jun. 28, 2022   (JP) .................................. 2022-103998

(51) Int. Cl.
*G06K 9/00*   (2022.01)
*G06T 7/50*   (2017.01)
(Continued)

(52) U.S. Cl.
CPC .................. *G06T 7/50* (2017.01); *G06T 7/62* (2017.01); *G06T 7/70* (2017.01); *G06V 10/25* (2022.01);
(Continued)

(58) Field of Classification Search
CPC ..... G06T 7/10; G06T 7/11; G06T 7/50; G06T 7/62; G06T 7/70; G06T 2207/10028;
(Continued)

(56) References Cited

U.S. PATENT DOCUMENTS 8,620,099 B2 * 12/2013 Sim .................... H04N 13/261
    382/168
10,898,805 B2 * 1/2021 Spencer .................... G06T 7/75
(Continued)

FOREIGN PATENT DOCUMENTS

JP   2003-195152 A    7/2003
JP   2007-311929 A   11/2007
(Continued)

*Primary Examiner* — Eric Rush
(74) *Attorney, Agent, or Firm* — Oliff PLC

(57) ABSTRACT

A transmission apparatus includes a communication interface configured to communicate with a reception apparatus, and a controller configured to acquire a depth image obtained by at least one depth camera measuring distances to a subject within a measurement range, identify, with reference to the acquired depth image, a window corresponding to a position of the subject from among a plurality of windows set within the measurement range and aligned in a depth direction, transmit a window identifier identifying the identified window to the reception apparatus via the communication interface, and for each pixel of the depth image, convert a measured distance into a relative distance within the window and transmit a resulting converted value as pixel data to the reception apparatus via the communication interface.

6 Claims, 5 Drawing Sheets

(51) Int. Cl.

| | | |
|---|---|---|
| *G06T 7/62* | (2017.01) | |
| *G06T 7/70* | (2017.01) | |
| *G06V 10/25* | (2022.01) | |
| *G06V 10/74* | (2022.01) | |
| *G06V 20/64* | (2022.01) | |
| *H04N 7/06* | (2006.01) | |
| *H04N 7/08* | (2006.01) | |
| *H04N 13/161* | (2018.01) | |
| *H04N 13/194* | (2018.01) | |
| *H04N 13/271* | (2018.01) | |

(52) U.S. Cl.
CPC ............ *G06V 10/761* (2022.01); *G06V 20/64* (2022.01); *H04N 7/06* (2013.01); *H04N 7/08* (2013.01); *H04N 13/161* (2018.05); *H04N 13/194* (2018.05); *H04N 13/271* (2018.05); *G06T 2207/10028* (2013.01); *G06T 2207/20216* (2013.01); *G06V 2201/12* (2022.01)

(58) Field of Classification Search
CPC . G06T 2207/20212; G06T 2207/20216; G06T 2207/20221; G06T 2207/20228; G06T 2207/30196; G06T 2207/30201; G06V 10/20; G06V 10/22; G06V 10/25; G06V 10/255; G06V 10/26; G06V 10/28; G06V 10/34; G06V 10/70; G06V 10/761; G06V 10/764; G06V 20/40; G06V 20/50; G06V 20/52; G06V 20/64; G06V 40/10; G06V 40/16; G06V 40/161; G06V 40/162; G06V 2201/12; H04N 7/015; H04N 7/025; H04N 7/06; H04N 7/08; H04N 7/12; H04N 13/10; H04N 13/122; H04N 13/128; H04N 13/139; H04N 13/161; H04N 13/172; H04N 13/178; H04N 13/189; H04N 13/194; H04N 13/20; H04N 13/271; H04N 19/00; H04N 19/10; H04N 19/167; H04N 19/169; H04N 19/17; H04N 19/196; H04N 19/198; H04N 19/20; H04N 19/30; H04N 19/33; H04N 19/46; H04N 19/50; H04N 19/59; H04N 19/597; H04N 19/65

USPC ........ 382/100, 103, 106, 115, 117, 118, 128, 382/154, 173, 232, 233, 239, 240, 244, 382/248, 251, 254, 260, 262, 264, 382/274–276, 282, 283, 286, 291, 293, 382/298–300, 305, 312, 325; 345/418, 345/419, 421, 422, 424, 611, 613, 616, 345/619–623, 626–629, 642, 647, 660; 348/14.01, 14.12, 14.13, 42, 43, 46, 51, 348/61, 77, 135, 139, 143, 207.99, 222.1, 348/241, 384.1, 387.1, 388.1, 390.1, 441, 348/469, 473, 474; 375/240, 240.01, 375/240.26

See application file for complete search history.

(56) References Cited

U.S. PATENT DOCUMENTS

| | | | |
|---|---|---|---|
| 2003/0123872 A1 | 7/2003 | Yoshida et al. | |
| 2006/0050383 A1* | 3/2006 | Takemoto | H04N 13/194 |
| | | | 348/E13.02 |
| 2011/0317912 A1* | 12/2011 | Oh | H04N 5/145 |
| | | | 382/232 |
| 2014/0063018 A1* | 3/2014 | Takeshita | G06T 7/50 |
| | | | 345/427 |
| 2016/0373722 A1* | 12/2016 | Mishra | H04N 13/178 |
| 2017/0127046 A1* | 5/2017 | Das | H04N 13/239 |
| 2019/0313080 A1* | 10/2019 | Mitchell | G06T 17/005 |
| 2021/0018628 A1 | 1/2021 | Sato et al. | |
| 2023/0222765 A1* | 7/2023 | Kitamura | G06V 10/761 |
| | | | 382/106 |

FOREIGN PATENT DOCUMENTS

| | | |
|---|---|---|
| JP | 2013-156956 A | 8/2013 |
| JP | 2021-015089 A | 2/2021 |
| JP | 2021-068929 A | 4/2021 |
| WO | 2004/071102 A1 | 8/2004 |

* cited by examiner

TRANSMISSION APPARATUS, NON-TRANSITORY COMPUTER READABLE MEDIUM, AND RECEPTION APPARATUS THAT REDUCE THE PIXEL DATA SIZE OF THE DEPTH IMAGE

CROSS-REFERENCE TO RELATED APPLICATION

This application claims priority to Japanese Patent Application No. 2022-103998 filed on Jun. 28, 2022, the entire contents of which are incorporated herein by reference.

TECHNICAL FIELD

The present disclosure relates to a transmission apparatus, a program, and a reception apparatus.

BACKGROUND

Patent Literature (PTL) 1 discloses an apparatus that displays a composite image obtained by superimposing a two-dimensional map image of depth information for a subject generated by a depth camera module on an image generated by a photography camera module.

CITATION LIST

Patent Literature

PTL 1: JP 2021-068929 A

SUMMARY

In a case in which the pixel data size of the depth image needs to be reduced due to circumstances such as transmitting a composite image via HDMI® (HDMI is a registered trademark in Japan, other countries, or both), the resolution of the depth image may decrease, or the depth range may be narrowed. The term "HDMI®" is an abbreviation of High-Definition Multimedia Interface.

It would be helpful to reduce the pixel data size of the depth image while controlling a decrease in resolution of the depth image and narrowing of the depth range.

A transmission apparatus according to the present disclosure includes:
 a communication interface configured to communicate with a reception apparatus; and
 a controller configured to acquire a depth image obtained by at least one depth camera measuring distances to a subject within a measurement range, identify, with reference to the acquired depth image, a window corresponding to a position of the subject from among a plurality of windows set within the measurement range and aligned in a depth direction, transmit a window identifier identifying the identified window to the reception apparatus via the communication interface, and for each pixel of the depth image, convert a measured distance into a relative distance within the window and transmit a resulting converted value as pixel data to the reception apparatus via the communication interface.

A program according to the present disclosure is configured to cause a computer for communicating with a reception apparatus to execute operations, the operations including:
 acquiring a depth image obtained by at least one depth camera measuring distances to a subject within a measurement range;
 identifying, with reference to the acquired depth image, a window corresponding to a position of the subject from among a plurality of windows set within the measurement range and aligned in a depth direction;
 transmitting a window identifier identifying the identified window to the reception apparatus;
 converting a measured distance into a relative distance within the window for each pixel of the depth image; and
 transmitting a resulting converted value as pixel data to the reception apparatus for each pixel of the depth image.

A reception apparatus according to the present disclosure includes:
 a communication interface configured to communicate with a transmission apparatus that acquires a depth image obtained by at least one depth camera measuring distances to a subject within a measurement range; and
 a controller configured to receive, from the transmission apparatus via the communication interface, a window identifier identifying a window corresponding to a position of the subject among a plurality of windows set within the measurement range and aligned in a depth direction, receive as pixel data, from the transmission apparatus via the communication interface, a converted value obtained by converting a measured distance into a relative distance within the window for each pixel of the depth image, identify the window corresponding to the received window identifier from among the plurality of windows, and restore the depth image by converting a relative distance within the identified window, indicated by the received pixel data, into a measured distance for each pixel of the depth image.

According to the present disclosure, it is possible to reduce the pixel data size of the depth image while controlling a decrease in resolution of the depth image and narrowing of the depth range.

DETAILED DESCRIPTION

Figure 1:
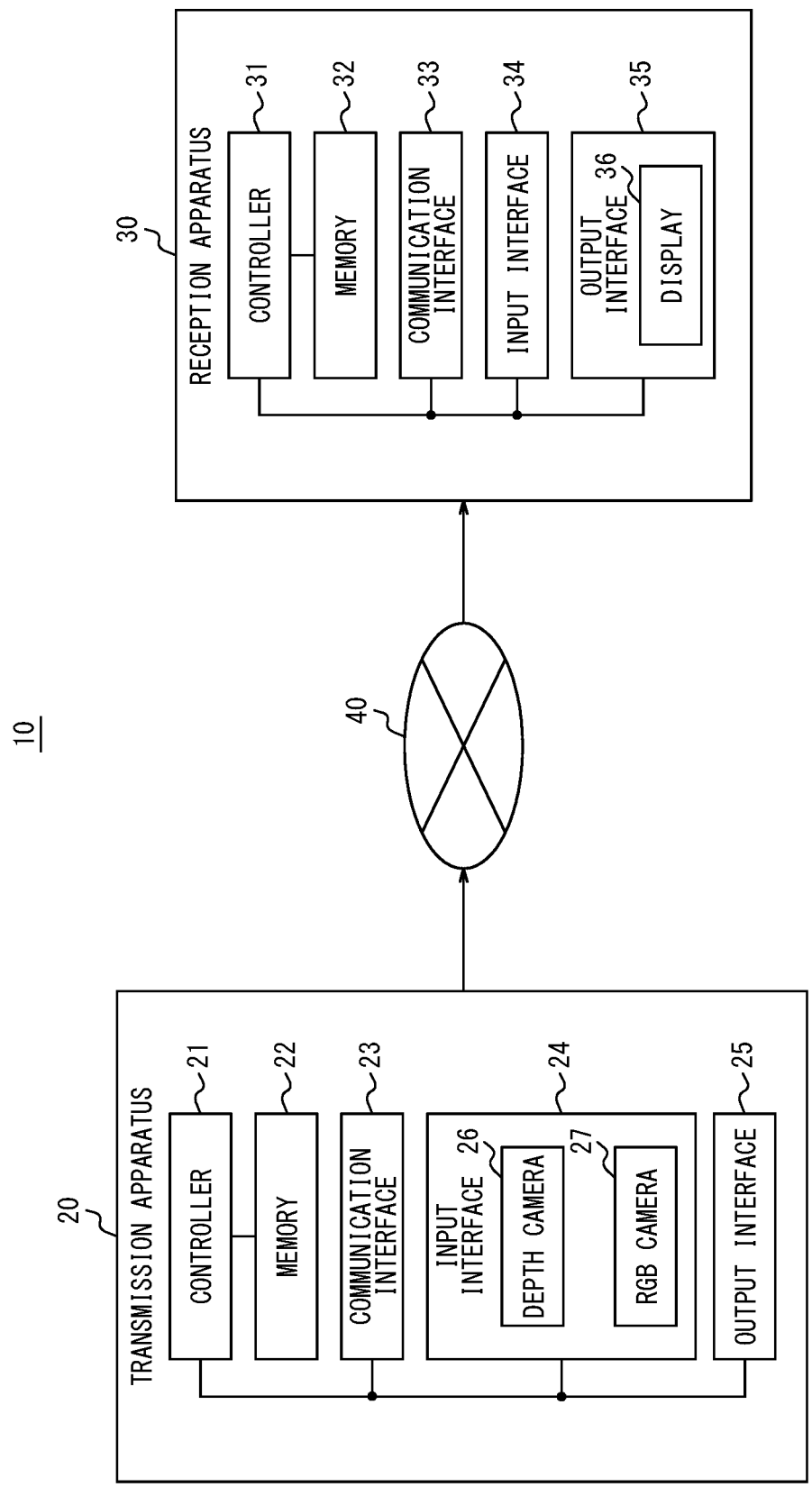
FIG. 1 is a block diagram illustrating a configuration of a communication system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a communication system 10 according to the present embodiment will be described with reference to FIG. 1.

The communication system 10 includes a transmission apparatus 20 and a reception apparatus 30. The transmission apparatus 20 and reception apparatus 30 communicate with each other via a network 40 in the present embodiment, but instead of going through other devices, these apparatuses may communicate with each other via cables only or may communicate wirelessly.

The transmission apparatus 20 is a terminal apparatus used by a first user U1. The transmission apparatus 20 is, for example, a general purpose computer, such as a PC, or a dedicated computer specialized for particular calculations. The term "PC" is an abbreviation of personal computer.

The reception apparatus 30 is a terminal apparatus used by a second user U2. The reception apparatus 30 is, for example, a general purpose computer, such as a PC, or a dedicated computer specialized for particular calculations.

The network 40 includes the Internet, at least one WAN, at least one MAN, or any combination thereof. The term "WAN" is an abbreviation of wide area network. The term "MAN" is an abbreviation of metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIGS. 1 and 2.

The transmission apparatus 20 acquires a depth image Di. The depth image Di is an image obtained by at least one depth camera 26 measuring the distances to a subject in a measurement range 28. The depth camera 26 is provided in the transmission apparatus 20 in the present embodiment but may instead be connected to the transmission apparatus 20 as an external input device. As an interface for connection, an interface compliant with a standard such as USB or Bluetooth® (Bluetooth is a registered trademark in Japan, other countries, or both) can be used. The term "USB" is an abbreviation of Universal Serial Bus. As illustrated in FIG. 2, a plurality of windows W1, . . . , Wn are set within the measurement range 28. The windows W1, . . . , Wn are aligned in the depth direction Z. That is, the windows W1, . . . , Wn are arranged at different depth positions from each other. The number n of windows may be any integer equal to or greater than 2, such as 30.

The transmission apparatus 20 identifies the window Wj corresponding to the position of the subject from among the plurality of windows W1, . . . , Wn with reference to the depth image Di. The transmission apparatus 20 transmits a window identifier identifying the window Wj to the reception apparatus 30. Upon receiving the window identifier from the transmission apparatus 20, the reception apparatus 30 identifies the window Wj corresponding to the received window identifier from among the plurality of windows W1, . . . , Wn.

For each pixel in the depth image Di, the transmission apparatus 20 converts the measured distance to a relative distance within the window Wj and transmits the resulting converted value as pixel data to the reception apparatus 30. The reception apparatus 30 restores the depth image Di by receiving the pixel data from the transmission apparatus 20 and converting the relative distance within the window Wj indicated by the received pixel data into a measured distance for each pixel of the depth image Di.

According to the present embodiment, it is possible to reduce the pixel data size of the depth image Di while controlling a decrease in resolution of the depth image Di and narrowing of the measurement range 28.

The plurality of windows W1, . . . , Wn is set so that at least two windows overlap each other. That is, the plurality of windows W1, . . . , Wn is arranged so that two or more windows exist at least at one depth position. In the present embodiment, the windows W1, . . . , Wn are set to overlap each other with a constant width in the depth direction Z depending on the size of the subject. For example, the subject is the first user U1, and the constant width is 0.2 meters or more and 0.8 meters or less. In the example illustrated in FIG. 2, the constant width is 0.5 meters, and the width in the depth direction Z of each window is 1 meter. In other words, in the example illustrated in FIG. 2, the window W1 is set to a range of 0 meters to 1 meter from the position of the depth camera 26 in the depth direction Z. The window W2 is set to a range of 0.5 meters to 1.5 meters from the position of the depth camera 26. The window W3 is set to a range of 1 meter to 2 meters from the position of the depth camera 26. In FIG. 2, the windows W2 and W3 are shifted horizontally to illustrate how the windows W1 and W2 overlap each other and how the windows W2 and W3 overlap each other, but the windows W2 and W3 are actually set within the measurement range 28, like the window W1.

As an example, suppose that the first user U1 is within a range of 0.7 meters to 1.2 meters from the position of the depth camera 26 in the depth direction Z. In the example illustrated in FIG. 2, the window W2 corresponds to the position of the first user U1. Therefore, the transmission apparatus 20 recognizes that the window W2 is the window Wj corresponding to the position of the subject with reference to the depth image Di. The transmission apparatus 20 transmits a window identifier "2" identifying the window W2 to the reception apparatus 30, and for each pixel in the depth image Di, converts the measured distance to a relative distance within the window W2 and transmits the resulting converted value as pixel data to the reception apparatus 30. Upon receiving the window identifier "2" from the transmission apparatus 20, the reception apparatus 30 recognizes that the window W2 is the window Wj corresponding to the position of the subject. The reception apparatus 30 restores the depth image Di by receiving the pixel data and converting the relative distance within the window W2 indicated by the received pixel data into a measured distance for each pixel of the depth image Di.

Figure 3:
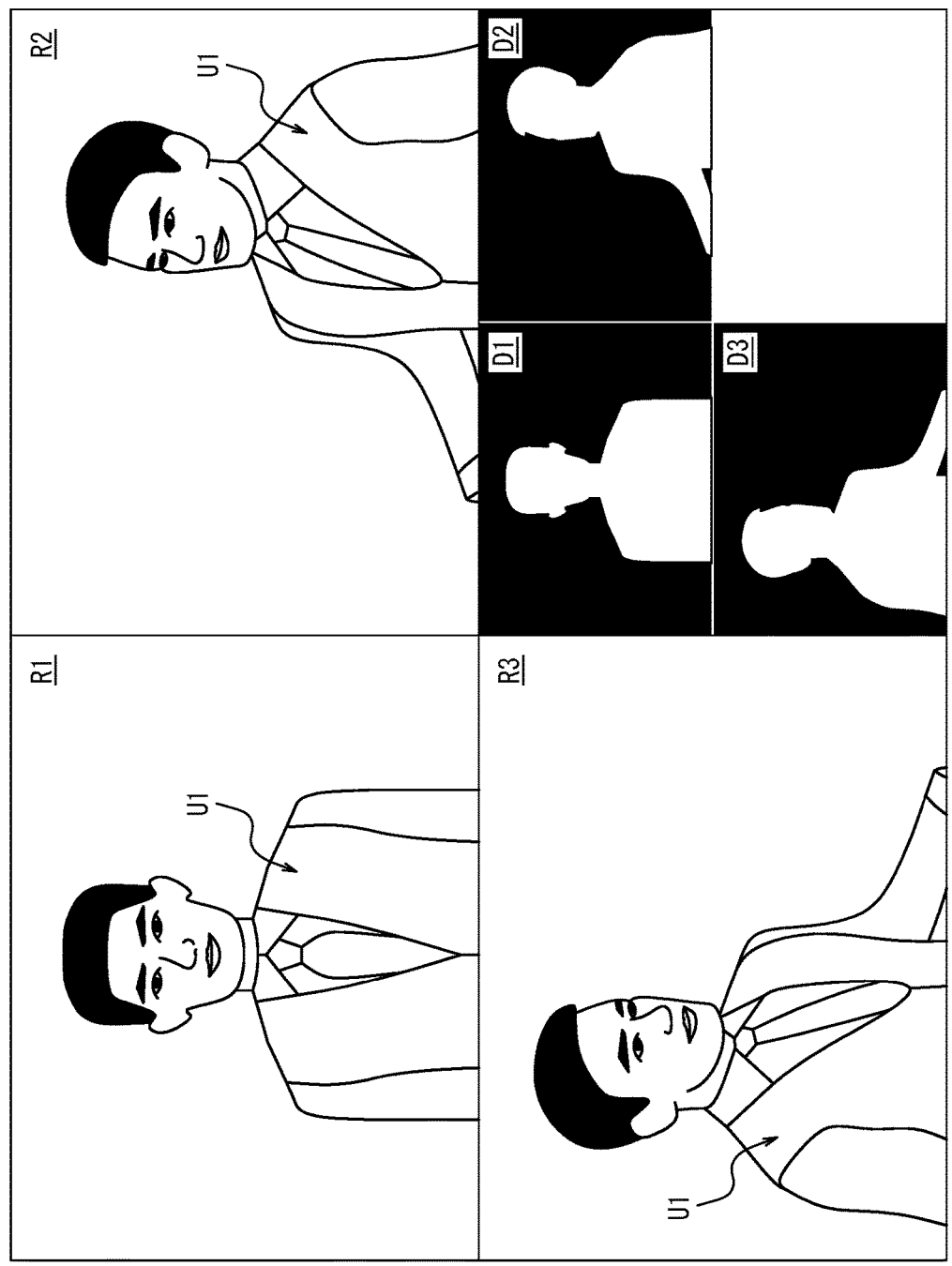
FIG. 3 is a diagram illustrating an example of a composite image according to the embodiment of the present disclosure.

In the present embodiment, the transmission apparatus 20 combines an RGB image Ri and the depth image Di. As a result, a composite image 11 such as the one illustrated in FIG. 3 is obtained. The RGB image Ri is an image of the subject captured by at least one RGB camera 27. The RGB camera 27 is provided in the transmission apparatus 20 in the present embodiment but may instead be connected to the transmission apparatus 20 as an external input device. As an interface for connection, an interface compliant with a standard such as USB or Bluetooth® can be used. The transmission apparatus 20 transmits the resulting composite image 11 to the reception apparatus 30. The reception apparatus 30 receives the composite image 11 from the transmission apparatus 20 via the network 40. The reception apparatus 30 displays the received composite image 11 on a display 36 for the second user U2. The display 36 is, for example, an LCD or an organic EL display. The term "LCD"

is an abbreviation of liquid crystal display. The term "EL" is an abbreviation of electro luminescent. The display 36 is provided in the reception apparatus 30 in the present embodiment but may instead be connected to the reception apparatus 30 as an external output device. As an interface for connection, for example, an interface compliant with a standard such as USB, HDMI®, or Bluetooth® can be used.

In the example illustrated in FIG. 3, RGB images R1, R2, R3 and depth images D1, D2, D3 are combined. The RGB images R1, R2, R3 are images of the first user U1 captured by RGB cameras respectively located in front, to the left, and to the right of the first user U1. The depth images D1, D2, D3 are images obtained by measuring the distances to the first user U1 by three depth cameras respectively located in front, to the left, and to the right of the first user U1.

For example, the composite image 11 could be transmitted via HDMI® from the transmission apparatus 20. A known method, such as HDMI® over IP or HDMI® over Ethernet® (Ethernet is a registered trademark in Japan, other countries, or both), can be used as the method for transmitting HDMI® signals over the network 40. The term "IP" is an abbreviation of Internet Protocol. In general, the pixel data of an RGB image is 8 bits for each RGB color element, i.e., 24 bits of data in total. With HDMI®, 8 bits of data are transmitted for each RGB channel. The pixel data of a depth image is 16-bit data. Hence, this data could be transmitted as is by HDMI® by dividing the data into the most significant 8 bits and least significant 8 bits and transmitting on any two of the three RGB channels. However, this approach would result in significant image degradation when bit errors occur in the channel transmitting the most significant 8 bits. It is also possible to reduce the pixel data size of the depth image to 8 bits and transmit the data on a single channel, but doing so would require either reducing the resolution of the depth image or narrowing the range of measurable distances, i.e., the depth range. For example, if the width of the measurement range 28 in the depth direction Z is 100 meters, and the 16-bit pixel data size is reduced to 8 bits by narrowing the measurement range 28, the width of the measurement range 28 in the depth direction Z would be reduced to about 0.4 meters.

In the present embodiment, the pixel data size of the depth image Di is reduced by dividing the space in front of the depth camera 26 into a plurality of overlapping windows W1, . . . , Wn of constant size and expressing the measured distance of each pixel as a relative distance within the corresponding window Wj. Therefore, when transmitting the composite image 11 by HDMI®, the pixel data of the depth image Di can be transmitted on a single channel while controlling a decrease in the resolution of the depth image Di and narrowing of the measurement range 28. The window identifier of the window Wj may be embedded in the free space in the lower right corner of the composite image 11 illustrated in FIG. 3 and transmitted on the same channel as the pixel data of the depth image Di or may be transmitted by a different communication route than the pixel data of the depth image Di.

A configuration of the transmission apparatus 20 according to the present embodiment will be described with reference to FIG. 1.

The transmission apparatus 20 includes a controller 21, a memory 22, a communication interface 23, an input interface 24, and an output interface 25.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the transmission apparatus 20 while controlling components of the transmission apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for the operations of the transmission apparatus 20 and data obtained by the operations of the transmission apparatus 20.

The communication interface 23 includes at least one interface for communication. The interface for communication is, for example, an interface compliant with HDMI®, an interface compliant with a wired LAN communication standard such as Ethernet®, or an interface compliant with a wireless LAN communication standard such as IEEE802.11 or a mobile communication standard such as LTE, the 4G standard, or the 5G standard. "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 23 communicates with the reception apparatus 30. In the present embodiment, the communication interface 23 communicates with the reception apparatus 30 by a communication method, such as HDMI®, in which the data of each pixel of an image is transmitted on a separate channel for each color element. The communication interface 23 receives data to be used for the operations of the transmission apparatus 20 and transmits data obtained by the operations of the transmission apparatus 20.

The input interface 24 includes the depth camera 26, the RGB camera 27, and at least one other interface for input. The interface for input is, for example, a physical key, a capacitive key, a pointing device, a touchscreen integrally provided with the display, or a microphone. The input interface 24 accepts an operation for inputting data to be used for the operations of the transmission apparatus 20. The input interface 24 may be connected to the transmission apparatus 20 as an external input device, instead of being provided in the transmission apparatus 20. As an interface for connection, for example, an interface compliant with a standard such as USB, HDMI®, or Bluetooth® can be used.

The output interface 25 includes at least one interface for output. The interface for output is, for example, a display or a speaker. The output interface 25 outputs data obtained by the operations of the transmission apparatus 20. The output interface 25 may be connected to the transmission apparatus 20 as an external output device, instead of being provided in the transmission apparatus 20. As an interface for connection, for example, an interface compliant with a standard such as USB, HDMI®, or Bluetooth® can be used.

The functions of the transmission apparatus 20 are realized by execution of a program according to the present embodiment by a processor serving as the controller 21. That is, the functions of the transmission apparatus 20 are realized by software. The program causes a computer to execute the operations of the transmission apparatus 20, thereby causing the computer to function as the transmission apparatus 20. That is, the computer executes the operations of the transmission apparatus 20 in accordance with the program to thereby function as the transmission apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the transmission apparatus 20 may be realized by a programmable circuit or a dedicated circuit serving as the controller 21. That is, some or all of the functions of the transmission apparatus 20 may be realized by hardware.

A configuration of the reception apparatus 30 according to the present embodiment will be described with reference to FIG. 1.

The reception apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the reception apparatus 30 while controlling components of the reception apparatus 30.

The memory 32 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 32 functions as, for example, a main memory, an auxiliary memory, or a cache memory. The memory 32 stores data to be used for the operations of the reception apparatus 30 and data obtained by the operations of the reception apparatus 30.

The communication interface 33 includes at least one interface for communication. The interface for communication is, for example, an interface compliant with HDMI®, an interface compliant with a wired LAN communication standard such as Ethernet®, or an interface compliant with a wireless LAN communication standard such as IEEE802.11 or a mobile communication standard such as LTE, the 4G standard, or the 5G standard.

The communication interface 33 communicates with the transmission apparatus 20. In the present embodiment, the communication interface 33 communicates with the transmission apparatus 20 by a communication method, such as HDMI®, in which the data of each pixel of an image is transmitted on a separate channel for each color element. The communication interface 33 receives data to be used for the operations of the reception apparatus 30 and transmits data obtained by the operations of the reception apparatus 30.

The input interface 34 includes at least one interface for input. The interface for input is, for example, a physical key, a capacitive key, a pointing device, a touchscreen integrally provided with the display, a camera, or a microphone. The camera is, for example, an RGB camera or a combination of an RGB camera and a depth camera. The input interface 34 accepts an operation for inputting data to be used for the operations of the reception apparatus 30. The input interface 34 may be connected to the reception apparatus 30 as an external input device, instead of being provided in the reception apparatus 30. As an interface for connection, for example, an interface compliant with a standard such as USB, HDMI®, or Bluetooth® can be used.

The output interface 35 includes the display 36 and at least one interface for output. The interface for output is, for example, a speaker. The output interface 35 outputs data obtained by the operations of the reception apparatus 30. The output interface 35 may be connected to the reception apparatus 30 as an external output device, instead of being provided in the reception apparatus 30. As an interface for connection, for example, an interface compliant with a standard such as USB, HDMI®, or Bluetooth® can be used.

The functions of the reception apparatus 30 are realized by execution of another program according to the present embodiment by a processor serving as the controller 31. That is, the functions of the reception apparatus are realized by software. The program causes a computer to execute the operations of the reception apparatus 30, thereby causing the computer to function as the reception apparatus 30. That is, the computer executes the operations of the reception apparatus 30 in accordance with the program to thereby function as the reception apparatus 30.

Some or all of the functions of the reception apparatus 30 may be realized by a programmable circuit or a dedicated circuit serving as the controller 31. That is, some or all of the functions of the reception apparatus may be realized by hardware.

Operations of the communication system 10 according to the present embodiment will be described with reference to FIGS. 4 and 5. These operations correspond to a communication method according to the present embodiment.

Figure 4:
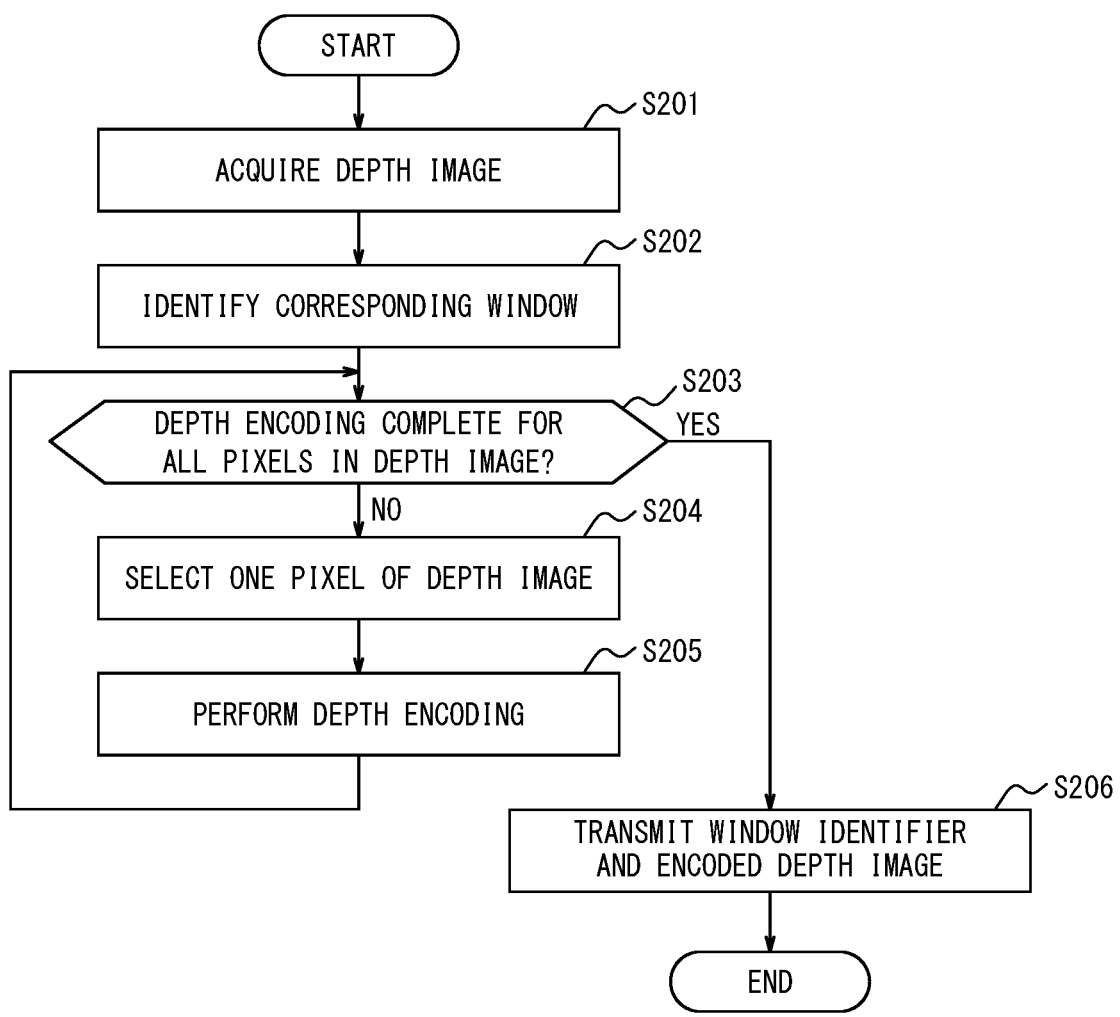
FIG. 4 is a flowchart illustrating operations of a transmission apparatus according to the embodiment of the present disclosure.

FIG. 4 illustrates operations of the transmission apparatus 20.

The processes from step S201 to step S206 are repeated while, for example, the first user U1 and the second user U2 are communicating with each other in a virtual three-dimensional space using the transmission apparatus 20 and the reception apparatus 30, respectively.

In step S201, the controller 21 acquires a depth image Di via at least one depth camera 26. In the present embodiment, the controller 21 acquires the depth image Di and also captures an RGB image Ri using at least one RGB camera 27. The controller 21 combines the acquired depth image Di with the captured RGB image Ri and stores the resulting composite image 11 in the memory 22. The controller 21 may acquire audio of the first user U1 via the microphone as the input interface 24. In the example illustrated in FIG. 3, the controller 21 acquires depth images D1, D2, D3 via three depth cameras located in front, to the left, and to the right of the first user U1 and captures RGB images R1, R2, R3 using RGB cameras located in front, to the left, and to the right of the first user U1. The controller 21 combines the acquired depth images D1, D2, D3 with the captured RGB images R1, R2, R3. As a result, a composite image 11 such as the one illustrated in FIG. 3 is obtained.

Figure 2:
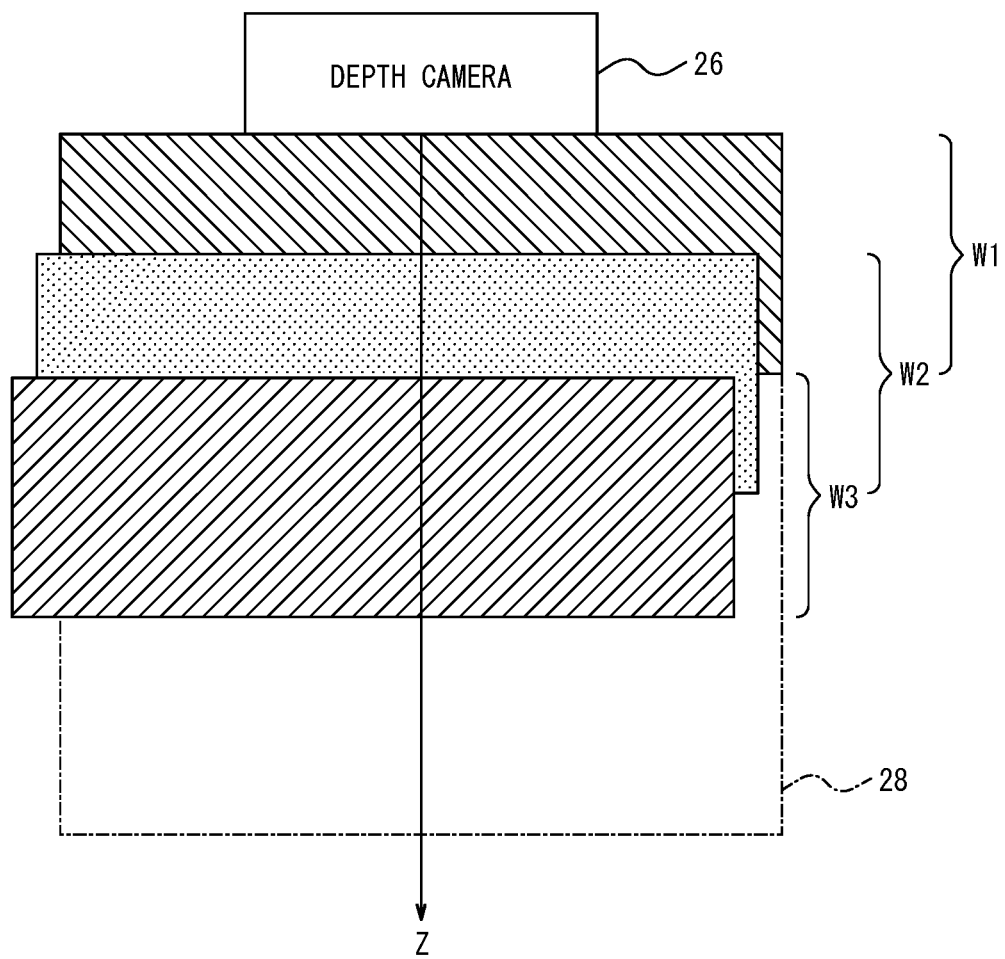
FIG. 2 is a diagram illustrating an example of a plurality of windows according to the embodiment of the present disclosure.

In step S202, the controller 21 refers to the depth image Di acquired in step S201 to identify the window Wj corresponding to the position of the subject from among the plurality of windows W1, . . . , Wn as illustrated in FIG. 2. The controller 21 stores the window identifier identifying the identified window Wj in the memory 22. The controller 21 may remove the background from the depth image Di acquired in step S201. In the present embodiment, the controller 21 may remove the background from both the depth image Di and the RGB image Ri included in the composite image 11 stored in the memory 22. In the example illustrated in FIG. 3, the controller 21 detects the position of the first user U1 and stores the window identifier of the window corresponding to the detected position in the memory 22 for each of the depth images D1, D2, D3 included in the composite image 11 obtained in step S201.

In step S203, the controller 21 checks whether depth encoding is complete for all pixels of the depth image Di acquired in step S201. In a case in which depth encoding is complete for all pixels of the depth image Di, the process in step S206 is executed. In a case in which depth encoding is not complete for one or more pixels of the depth image Di, the process in step S204 is executed. In the example illustrated in FIG. 3, in a case in which depth encoding is complete for all pixels of the depth images D1, D2, D3 included in the composite image 11 obtained in step S201, the process in step S206 is executed. In a case in which depth encoding is not complete for one or more pixels of the depth images D1, D2, D3, the process in step S204 is executed.

In step S204, the controller 21 selects one pixel, of the depth image Di acquired in step S201, for which depth encoding is not complete. In the example illustrated in FIG. 3, the controller 21 selects one pixel, of any one of the depth images D1, D2, D3 included in the composite image 11 obtained in step S201, for which depth encoding is not complete.

In step S205, the controller 21 performs depth encoding by converting the measured distance to a relative distance within the window Wj identified in step S202 for the pixel selected in step S204. The controller 21 stores the resulting converted value as encoded pixel data in the memory 22. For example, if the measured distance is 0.7 meters for the pixel selected in step S204 and the window Wj identified in step S202 is the window W2, then in the example illustrated in FIG. 2, the controller 21 calculates a relative distance of 0.2 meters within the window W2 by subtracting the minimum distance of 0.5 meters for the window W2 from the measured distance of 0.7 meters. The controller 21 stores 8-bit data representing the resulting calculated value as encoded pixel data in the memory 22. In the present embodiment, the controller 21 overwrites the pixel data of the corresponding pixel of the depth image Di, included in the composite image 11 stored in the memory 22, with the encoded pixel data. In the example illustrated in FIG. 3, the controller 21 converts the measured distance for the pixel selected in step S204, in one of the depth images D1, D2, D3 included in the composite image 11 obtained in step S201, to the relative distance within the window corresponding to the window identifier stored in the memory 22 and stores the resulting converted value as encoded pixel data by overwriting in the memory 22. After step S205, the process in step S203 is executed again.

In step S206, the controller 21 transmits the window identifier stored in the memory 22 to the reception apparatus 30 via the communication interface 23 and also transmits, for each pixel of the depth image Di, the pixel data stored in the memory 22 to the reception apparatus 30 via the communication interface 23. In the present embodiment, the controller 21 transmits at least the composite image 11 stored in the memory 22 to the reception apparatus 30 by a communication method, such as HDMI®, in which the data of each pixel of an image is transmitted on a separate channel for each color element. The transmitted composite image 11 contains encoded pixel data instead of the original pixel data for each pixel of the depth image Di. The controller 21 transmits this encoded pixel data to the reception apparatus 30 on one of the channels used in the above-described communication method. In a case in which the controller 21 acquires audio of the first user U1 in step S201, the acquired audio is also transmitted to the reception apparatus 30 via the communication interface 23. In the example illustrated in FIG. 3, the controller 21 embeds the window identifier stored in the memory 22 into the free space of the composite image 11 obtained in step S201 and then transmits the composite image 11 to the reception apparatus 30 by HDMI®. Specifically, the controller 21 transmits the data of each pixel of the RGB images R1, R2, R3 included in the composite image 11 to the reception apparatus 30 on the three respective RGB channels for each RGB color element. The controller 21 transmits the encoded pixel data for each of the depth images D1, D2, D3 included in the composite image 11 and the window identifier to the reception apparatus 30 on one of the three RGB channels.

Figure 5:
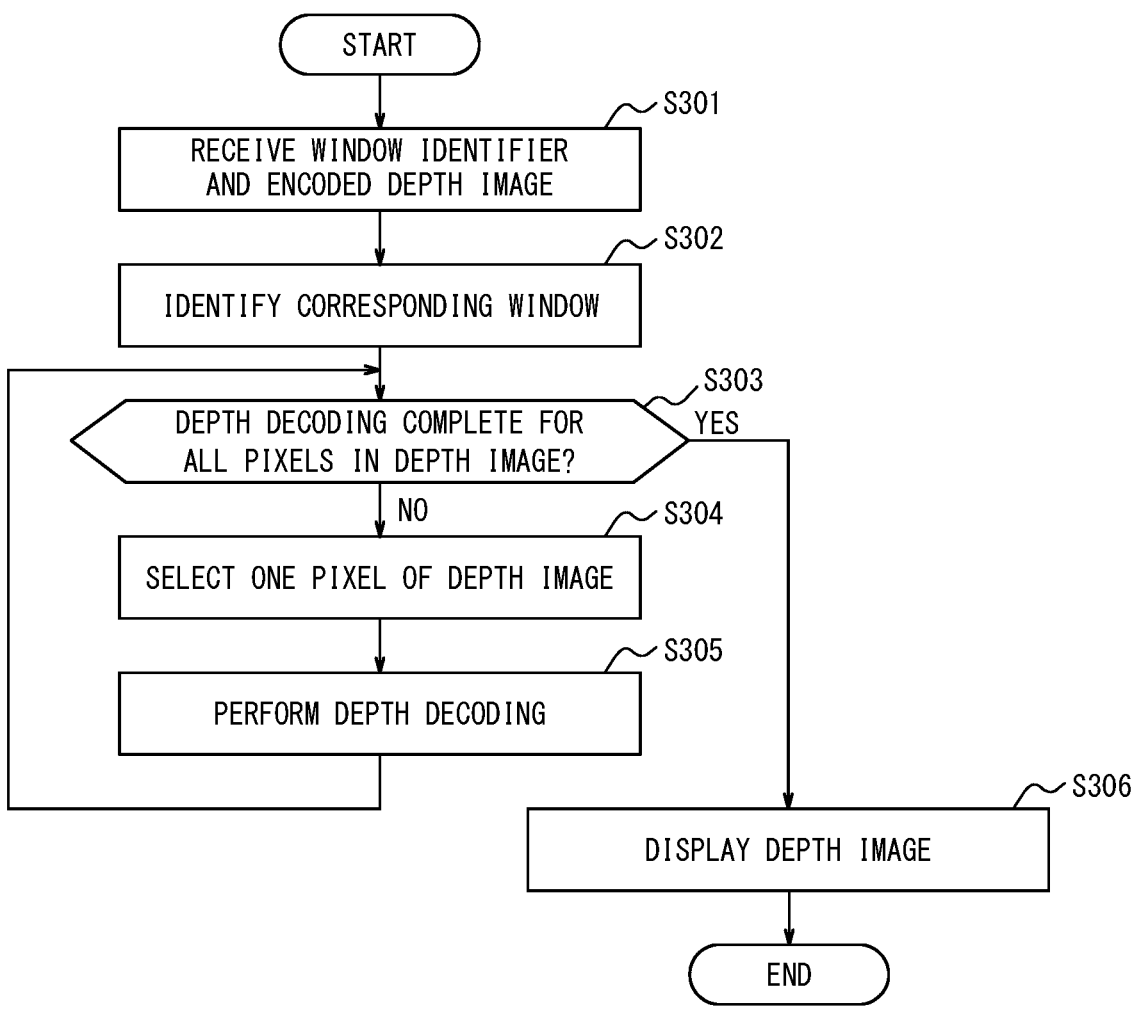
FIG. 5 is a flowchart illustrating operations of a reception apparatus according to the embodiment of the present disclosure.

FIG. 5 illustrates operations of the reception apparatus 30.

The processes from step S301 to step S306 are repeated while, for example, the first user U1 and the second user U2 are communicating with each other in a virtual three-dimensional space using the transmission apparatus 20 and the reception apparatus 30, respectively.

In step S301, the controller 31 receives the window identifier from the transmission apparatus 20 via the communication interface 33 and also receives, for each pixel of the depth image Di, the pixel data from the transmission apparatus 20 via the communication interface 33. In the present embodiment, the controller 31 receives at least the composite image 11 from the transmission apparatus 20 using the above-described communication method and stores the received composite image 11 in the memory 32. The received composite image 11 contains encoded pixel data instead of the original pixel data for each pixel of the depth image Di. The controller 31 receives this encoded pixel data from the transmission apparatus 20 on one of the channels used in the above-described communication method. The controller 31 may receive the audio of the first user U1 from the transmission apparatus 20 via the communication interface 33. In the example illustrated in FIG. 3, the controller 31 receives the composite image 11, with the window identifier embedded into the free space of the composite image 11, from the transmission apparatus 20 by HDMI®. Specifically, the controller 31 receives the data of each pixel of the RGB images R1, R2, R3 included in the composite image 11 from the transmission apparatus 20 on the three respective RGB channels for each RGB color element. The controller 31 receives the encoded pixel data for each of the depth images D1, D2, D3 included in the composite image 11 and the window identifier from the transmission apparatus 20 on one of the three RGB channels.

In step S302, the controller 31 identifies the window Wj, corresponding to the window identifier received in step S301, from among the plurality of windows W1, . . . , Wn as illustrated in FIG. 2. In the example illustrated in FIG. 3, the controller 31 identifies the window corresponding to the window identifier received in step S301 for each of the depth images D1, D2, D3 included in the composite image 11 received in step S301.

In step S303, the controller 31 checks whether depth decoding is complete for all pixels of the depth image Di received in step S301, i.e., whether the depth image Di has been restored. In a case in which depth decoding is complete for all pixels of the depth image Di, the process in step S306 is executed. In a case in which depth decoding is not complete for one or more pixels of the depth image Di, the process in step S304 is executed. In the example illustrated in FIG. 3, in a case in which depth decoding is complete for all pixels of the depth images D1, D2, D3 included in the composite image 11 received in step S301, i.e., a case in which the depth images D1, D2, D3 have all been restored, the process in step S306 is executed. In a case in which depth decoding is not complete for one or more pixels of the depth images D1, D2, D3, i.e., in a case in which any one of the depth images D1, D2, D3 has not been restored, the process in step S304 is executed.

In step S304, the controller 31 selects one pixel, of the depth image Di received in step S301, for which depth decoding is not complete. In the example illustrated in FIG. 3, the controller 31 selects one pixel, of any one of the depth images D1, D2, D3 included in the composite image 11 received in step S301, for which depth decoding is not complete.

In step S305, the controller 31 performs depth decoding by converting the relative distance, indicated by the pixel data received in step S301, in the window Wj identified in step S302 to a measured distance for the pixel selected in step S304. The controller 31 stores the resulting converted value as decoded pixel data in the memory 32. For example, if the window Wj identified in step S302 is the window W2 and the relative distance, indicated by the pixel data received in step S301, is 0.2 meters within the window W2 for the pixel selected in step S304, then in the example illustrated in FIG. 2, the controller 31 calculates a measured distance of 0.7 meters by adding the minimum distance of 0.5 meters for the window W2 to the relative distance within the window W2 of 0.2 meters. The controller 31 stores 16-bit data representing the resulting calculated value as decoded pixel data in the memory 32. In the present embodiment, the controller 31 overwrites the pixel data of the corresponding pixel of the depth image Di, included in the composite image 11 stored in the memory 32, with the decoded pixel data. In the example illustrated in FIG. 3, the controller 31 converts the relative distance within the window identified in step S302 for the pixel selected in step S304, in one of the depth images D1, D2, D3 included in the composite image 11 received in step S301, to the measured distance and stores the resulting converted value as decoded pixel data in the memory 32. After step S305, the process in step S303 is executed again.

In step S306, the controller 31 displays the depth image Di restored in step S303 through step S305 on the display 36 for the second user U2. In the present embodiment, the controller 31 displays the composite image 11 stored in the memory 32 on the display 36, with the depth image Di received in step S301 being replaced by the image restored in step S303 through step S305. In a case in which audio of the first user U1 was received in step S301, the controller 31 outputs the received audio from a speaker as the output interface 35. In the example illustrated in FIG. 3, the controller 31 displays the composite image 11, received in step S301, on the display 36 while displaying the pixel data decoded in step S303 through step S305 instead of the encoded pixel data for each pixel of the depth images D1, D2, D3.

According to the present embodiment, the above-described operations can reduce the pixel data size of the depth image Di without significantly reducing the resolution of the depth image Di or narrowing the depth range. For example, when the distance measured by the depth camera 26 is expressed in 16 bits, setting a plurality of windows W1, . . . , Wn so that the relative distance within each window can be expressed in 8 bits enables the pixel data of the depth image Di to be transmitted on a single HDMI® channel. Furthermore, according to the present embodiment, a realistic hologram of a subject in a virtual three-dimensional space can be generated and displayed by transmitting the composite image 11.

As a variation of the present embodiment, the same pixel data of the depth image Di may be transmitted from the transmission apparatus 20 on any two or on all three RGB channels, and the received data may be averaged by the reception apparatus 30. In this variation, the controller 21 of the transmission apparatus 20 transmits the encoded pixel data for each pixel of the depth image Di to the reception apparatus 30 on one of the channels used in the above-described communication method, and the same data is transmitted to the reception apparatus 30 on one or more of the remaining channels used in that communication method. The controller 31 of the reception apparatus 30 receives the encoded pixel data for each pixel of the depth image Di from the transmission apparatus 20 not only on one of the channels used in the communication method, but also on one or more of the remaining channels used in the communication method. The controller 31 restores the depth image Di by averaging the converted values obtained on respective channels for each pixel of the depth image Di. For example, the controller 21 of the transmission apparatus 20 transmits the encoded pixel data for each of the depth images D1, D2, D3 included in the composite image 11 to the reception apparatus 30 on all three RGB channels. The controller 31 of the reception apparatus 30 receives the encoded pixel data for each of the depth images D1, D2, D3 included in the composite image 11 from the transmission apparatus 20 on all three RGB channels. Each time a pixel is selected for each of the depth images D1, D2, D3, the controller 31 converts the value of the relative distance received as pixel data on each channel into a value of the measured distance, divides the total of the resulting values by 3, i.e., the number of channels, and stores the resulting average value as decoded pixel data in the memory 32.

According to this variation, the effect of bit errors that may occur in any of the channels can be reduced. Image degradation can thereby be suppressed.

As another variation of the present embodiment, the YCbCr color format may be used instead of the RGB color format.

Examples of some embodiments of the present disclosure are described below. However, it should be noted that the embodiments of the present disclosure are not limited to these examples.

[Appendix 1] A transmission apparatus comprising:
a communication interface configured to communicate with a reception apparatus; and
a controller configured to acquire a depth image obtained by at least one depth camera measuring distances to a subject within a measurement range, identify, with reference to the acquired depth image, a window corresponding to a position of the subject from among a plurality of windows set within the measurement range and aligned in a depth direction, transmit a window identifier identifying the identified window to the reception apparatus via the communication interface, and for each pixel of the depth image, convert a measured distance into a relative distance within the window and transmit a resulting converted value as pixel data to the reception apparatus via the communication interface.

[Appendix 2] The transmission apparatus according to appendix 1, wherein at least two windows among the plurality of windows overlap each other.

[Appendix 3] The transmission apparatus according to appendix 1 or 2, wherein
the communication interface is configured to communicate with the reception apparatus using a communication method for transmitting data of each pixel in an image on a separate channel for each color element, and
the controller is configured to transmit the pixel data to the reception apparatus on any one channel used in the communication method.

[Appendix 4] The transmission apparatus according to appendix 3, wherein the controller is configured to transmit data that is identical to the pixel data to the reception apparatus on one or more remaining channels used in the communication method.

[Appendix 5] The transmission apparatus according to any one of appendices 1 to 4, wherein the plurality of windows overlap each other in the depth direction with a constant width depending on a size of the subject.

[Appendix 6] The transmission apparatus according to appendix 5, wherein
the subject is a user of the transmission apparatus, and
the constant width is 0.2 meters or more and 0.8 meters or less.

[Appendix 7] A program configured to cause a computer for communicating with a reception apparatus to execute operations, the operations comprising:
acquiring a depth image obtained by at least one depth camera measuring distances to a subject within a measurement range;
identifying, with reference to the acquired depth image, a window corresponding to a position of the subject from among a plurality of windows set within the measurement range and aligned in a depth direction;
transmitting a window identifier identifying the identified window to the reception apparatus;
converting a measured distance into a relative distance within the window for each pixel of the depth image; and
transmitting a resulting converted value as pixel data to the reception apparatus for each pixel of the depth image.

[Appendix 8] A reception apparatus comprising:
a communication interface configured to communicate with a transmission apparatus that acquires a depth image obtained by at least one depth camera measuring distances to a subject within a measurement range; and
a controller configured to receive, from the transmission apparatus via the communication interface, a window identifier identifying a window corresponding to a position of the subject among a plurality of windows set within the measurement range and aligned in a depth direction, receive as pixel data, from the transmission apparatus via the communication interface, a converted value obtained by converting a measured distance into a relative distance within the window for each pixel of the depth image, identify the window corresponding to the received window identifier from among the plurality of windows, and restore the depth image by converting a relative distance within the identified window, indicated by the received pixel data, into a measured distance for each pixel of the depth image.

[Appendix 9] The reception apparatus according to appendix 8, wherein
the communication interface is configured to communicate with the transmission apparatus using a communication method for transmitting data of each pixel in an image on a separate channel for each color element, and
the controller is configured to receive the pixel data from the transmission apparatus on any one channel used in the communication method.

[Appendix 10] The reception apparatus according to appendix 9, wherein the controller is configured to receive the pixel data from the transmission apparatus also on one or more remaining channels used in the communication method and restore the depth image by averaging converted values obtained on respective channels for each pixel of the depth image.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A transmission apparatus comprising:
a communication interface configured to communicate with a reception apparatus; and
a processor configured to acquire a depth image obtained by at least one depth camera measuring distances to a subject within a measurement range, identify, with reference to the acquired depth image, a window corresponding to a position of the subject from among a plurality of windows set within the measurement range and aligned in a depth direction, transmit a window identifier identifying the identified window to the reception apparatus via the communication interface, and for each pixel of the depth image, convert a measured distance into a relative distance within the window and transmit a resulting converted value as pixel data to the reception apparatus via the communication interface, wherein:
the communication interface is configured to communicate with the reception apparatus using a communication method for transmitting data of each pixel in an image on a separate channel for each color element,
the processor is configured to transmit the pixel data to the reception apparatus on any one channel used in the communication method, and
the processor is configured to transmit data that is identical to the pixel data to the reception apparatus on one or more remaining channels used in the communication method.

2. The transmission apparatus according to claim 1, wherein at least two windows among the plurality of windows overlap each other.

3. The transmission apparatus according to claim 1, wherein the plurality of windows overlap each other in the depth direction with a constant width depending on a size of the subject.

4. The transmission apparatus according to claim 3, wherein
the subject is a user of the transmission apparatus, and
the constant width is 0.2 meters or more and 0.8 meters or less.

5. A non-transitory computer readable medium storing a program configured to cause a computer for communicating with a reception apparatus to execute operations, the operations comprising:
acquiring a depth image obtained by at least one depth camera measuring distances to a subject within a measurement range;
identifying, with reference to the acquired depth image, a window corresponding to a position of the subject from among a plurality of windows set within the measurement range and aligned in a depth direction;
transmitting a window identifier identifying the identified window to the reception apparatus;
converting a measured distance into a relative distance within the window for each pixel of the depth image; and
transmitting a resulting converted value as pixel data to the reception apparatus for each pixel of the depth image, wherein:
the computer is configured to communicate with the reception apparatus using a communication method for transmitting data of each pixel in an image on a separate channel for each color element,
the pixel data is transmitted to the reception apparatus on any one channel used in the communication method, and
data that is identical to the pixel data is transmitted to the reception apparatus on one or more remaining channels used in the communication method.

6. A reception apparatus comprising:
a communication interface configured to communicate with a transmission apparatus that acquires a depth image obtained by at least one depth camera measuring distances to a subject within a measurement range; and
a processor configured to receive, from the transmission apparatus via the communication interface, a window identifier identifying a window corresponding to a position of the subject from among a plurality of windows set within the measurement range and aligned in a depth direction, receive as pixel data, from the transmission apparatus via the communication interface, a converted value obtained by converting a measured distance into a relative distance within the window for each pixel of the depth image, identify the window corresponding to the received window identifier from among the plurality of windows, and restore the depth image by converting a relative distance within the identified window, indicated by the received pixel data, into a measured distance for each pixel of the depth image, wherein:
the communication interface is configured to communicate with the transmission apparatus using a communication method for transmitting data of each pixel in an image on a separate channel for each color element,
the processor is configured to receive the pixel data from the transmission apparatus on any one channel used in the communication method, and
the processor is configured to receive the pixel data from the transmission apparatus also on one or more remaining channels used in the communication method and restore the depth image by averaging converted values obtained on respective channels for each pixel of the depth image.

* * * * *